United States Patent
Henderson et al.

(10) Patent No.: US 6,991,255 B2
(45) Date of Patent: Jan. 31, 2006

(54) INTERCONNECTABLE INFLATABLE AIRBAG CUSHION MODULE

(75) Inventors: David Henderson, Ogden, UT (US); Kurt Petersen, Newton, UT (US); Daniel Vine, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/180,255

(22) Filed: Jun. 25, 2002

(65) Prior Publication Data

US 2003/0234523 A1     Dec. 25, 2003

(51) Int. Cl.
*B60R 21/22*     (2006.01)

(52) U.S. Cl. ............... 280/730.2; 280/743.2

(58) Field of Classification Search ........... 280/743.1, 280/729, 730.2, 749, 728.2, 743.2
See application file for complete search history.

(56) References Cited

U.S. PATENT DOCUMENTS

| | | | |
|---|---|---|---|
| 4,690,413 A * | 9/1987 | Adkins ............... 277/598 |
| 5,333,899 A * | 8/1994 | Witte ............... 280/730.2 |
| 5,893,786 A * | 4/1999 | Stevens ............... 441/89 |
| 6,073,961 A * | 6/2000 | Bailey et al. ........... 280/730.2 |
| 6,237,941 B1 * | 5/2001 | Bailey et al. ........... 280/730.2 |
| 6,237,943 B1 * | 5/2001 | Brown et al. ........... 280/730.2 |
| 6,390,345 B1 * | 5/2002 | Brown et al. ........... 224/578 |
| 6,454,296 B1 * | 9/2002 | Tesch et al. ............ 280/730.2 |
| 6,460,879 B2 * | 10/2002 | Tanase et al. ........... 280/730.2 |
| 6,474,681 B2 * | 11/2002 | Peer et al. ............ 280/730.2 |
| 6,505,853 B2 * | 1/2003 | Brannon et al. ......... 280/730.2 |
| 6,540,254 B2 * | 4/2003 | Bieber et al. ........... 280/732 |
| 6,565,118 B2 * | 5/2003 | Bakhsh et al. .......... 280/730.2 |
| 6,616,178 B1 * | 9/2003 | Nanbu ............... 280/730.2 |
| 6,631,922 B2 * | 10/2003 | Hess et al. ............ 280/730.2 |
| 6,666,475 B2 * | 12/2003 | Kippschull ............ 280/730.2 |
| 6,848,708 B2 * | 2/2005 | Green et al. ............ 280/729 |
| 2002/0024204 A1 | 2/2002 | Fischer |
| 2002/0027340 A1 | 3/2002 | Koster |

FOREIGN PATENT DOCUMENTS

| | | |
|---|---|---|
| DE | 19926076 | 12/1999 |
| EP | 0814001 | 10/2000 |
| JP | 3-32956 | 2/1991 |

* cited by examiner

*Primary Examiner*—Gene O. Crawford
*Assistant Examiner*—Rashmi Sharma
(74) *Attorney, Agent, or Firm*—Sally J. Brown

(57) ABSTRACT

An inflatable cushion module is disclosed. The inflatable cushion module is configured to be combined with other inflatable cushion modules to form a modular airbag system. Such modular airbag systems may be used to protect passengers of a vehicle from impact with a side surface of the vehicle. In general, the inflatable cushion module has an airbag and an attachment mechanism for attaching the airbag to the airbag of another module. When combined, the inflatable cushion modules form a single airbag system which can be used to protect the passengers of a vehicle from lateral impact. The airbag system can be configured to protect passengers in a single row of seats as well as passengers in two or more rows of seats.

33 Claims, 8 Drawing Sheets

INTERCONNECTABLE INFLATABLE AIRBAG CUSHION MODULE

BACKGROUND OF THE INVENTION

1. Field of the Invention

The present invention relates to vehicular airbag cushions. More specifically, the present invention relates to modular airbag cushions which can be connected to other airbag cushions in order to facilitate providing airbag protection over a relatively long area such as the side of a minivan or sport utility vehicle.

2. Technical Background

Inflatable safety restraint devices, or airbags, are now required by law to be installed in most new vehicles. Airbags are typically installed in the steering wheel and in the dashboard on the passenger side of a car. In the event of an accident, an accelerometer within the vehicle measures the abnormal deceleration and triggers the ignition of an explosive charge. Expanding gases from the charge fill the airbags, which immediately inflate in front of the driver and passenger to protect them from impact against the windshield.

Side impact airbags, also known as inflatable curtains, have been developed in response to the need for similar protection from impacts in a lateral direction, or against the side of the vehicle. These side impact airbags are typically located within the roof rails of the vehicle. When they are inflated they descend down from the roof and form a barrier between the occupants and the side of the vehicle.

Despite their enormous lifesaving potential, the effectiveness of side impact airbags has been somewhat limited by the speed with which inflation gases are able to fill the cushion. Side impact cushions are often designed to unfold or unroll downward to inflate beside a person to keep the person from hitting the door or window during lateral impact. Since a vehicle occupant may be leaning forward, reclined in the seat, or at any position between, such cushions are often made somewhat long to ensure that the occupant hits the cushion. The cushions must also be designed such that the seatbelts and seat backs of the vehicle do not catch the inflatable airbag curtain. The curtains may be provided with dead zones which do not inflate, but allow the curtain to inflate around seatbelts, seat backs, and other obstacles in the vehicle. The dead zones may also connect the various inflatable protecting zones of the airbag curtain creating a single tension line along a side of a vehicle when the curtain is inflated.

Cushions for inflatable curtains are often inflated by an inflator positioned either fore or aft of the cushion. Consequently, unlike many front impact airbags, a long gas flow path exists between the inflator and the outermost extent of the cushion. The length of the gas flow path is problematic for a number of reasons. The cushions are unable to inflate rapidly enough to provide optimal protection. Since most airbag systems are unable to detect a collision until impact has begun to occur, the airbag must move from an uninflated, stowed configuration, to a fully inflated configuration, within a small fraction of a second. The long flow path increases the time required by the inflation gases to traverse the cushion. Thus, the cushion may not obtain a fully inflated state before the vehicle occupant strikes the cushion.

Some inflatable curtains are designed to protect only the passengers of the front seats. Other inflatable curtains may be designed to protect both the occupants of the front seats and the seats directly behind the front seats. For example, in a vehicle with three seating areas, such as a minivan or sport-utility vehicle, these side impact cushions only have protection zones for the front and middle seats. The occupants of the rear seat are not protected by the airbag cushion.

Recently, inflatable curtains have been developed to protect passenger in all three rows of passenger seating in minivans and sport utility vehicles. In an airbag cushion designed to protect passengers in three seating areas, there may be a problem with uniform inflation of the cushion. Generally, long airbag cushions are inflated by a single inflator. Using a single inflator for all protection zones costs less than using multiple inflators for the cushion. The use of one inflator also reduces the risk of airbag malfunction. However, because the airbags use one inflator, there may be unequal pressure buildup in the protection zones. The pressure buildup can cause the cushion to inflate in a non-uniform manner preventing the protection of the vehicle occupants.

The long curtains are also expensive to manufacture and install in minivans or sport utility vehicles. Before a curtain is installed in a vehicle, it is generally folded or rolled and then inserted into a package known as a sock. Specially manufactured large folding machines are necessary to fold the long curtains. The use of special equipment adds to the cost of the final airbag system. Additionally, packaging these long curtains into the vehicle from the A-pillar to the D-pillar is also proving difficult for the car manufacturer. The production of very long cushions can be troublesome and require special training and equipment which again adds to the cost of the airbag system.

Generally, the airbag cushions have zones which do not inflate, but serve to connect the inflation zones. These dead zones add weight to the airbag cushion. Moreover, because the dead zones use the same amount of fabric and other materials as the inflating protection zones, the cost of this unused fabric and materials add to the overall cost of the airbag system.

Today's vehicles come with a variety of accessory systems. These accessory systems include rear heating and cooling, private audio systems for the passengers, and theatre systems just to name a few. These systems require significant wiring and duct work. Generally, the wiring and duct work are concealed within the roof or floor of the vehicle. However, the space available in the roof and floor of the vehicle is very limited. Wiring and duct work contained in the floor of the vehicle may be damaged by the feet of vehicle occupants, thus the roof is the preferred location. Inflatable curtains and their wiring and duct work must compete with the accessory systems for space within the roof of the vehicle. The problem of limited space within the roof of the vehicle is compounded by the dead zones or connecting zones which are typically present in inflatable curtains. These dead zones require as much space as an inflating zone, but do not inflate to protect vehicle occupants.

The specific seating arrangement of a vehicle depends on the body type and manufacturer of the vehicle. That is the seating arrangement of a minivan of a manufacturer will differ from the seating arrangement of a sport utility vehicle of the same manufacturer. Additionally, the seating arrangement of a minivan or sport utility vehicle of a second manufacturer will be different than the seating arrangement in the minivan and sport utility vehicle of the first manufacturer. Thus, the seats of the vehicle may be spaced closer or farther from each other depending on the particular vehicle type and manufacturer. Because of the non-uniformity of seating arrangements in vehicles, airbag curtains must be designed and manufactured for each specific vehicle make and model. The cost of such cushions is increased because the airbag curtains cannot be mass designed and produced for many different types of vehicles.

Accordingly, a need exists for a side impact airbag cushion configured to protect occupants of all seats of a vehicle. In particular, a need exists for an apparatus that can provide side impact protection for the occupants of the front, middle, and rear seats of a vehicle. It would be an additional improvement if the airbag cushion allowed for a more uniform inflation of the cushion. A need further exists for such an apparatus and method that minimizes the expense of manufacture and installation of the cushion. Furthermore, a need exists for an inflatable curtain airbag that minimizes the space required for installation. It would be an additional improvement to provide a cushion that allows a cushion or cushions to be designed for and installed in a number of types of vehicles with different manufactures. It would be a further advancement to provide an inflatable airbag curtain that minimizes dead zones.

SUMMARY OF THE INVENTION

The present invention relates to inflatable airbag cushion modules. In general the cushion modules have an inflatable airbag which is configured to be attached to another inflatable airbag through an attachment mechanism. Such modular airbag cushions may be attached together before or after installation in a vehicle. The interconnected airbags function as a single airbag system when installed in a vehicle and may serve to protect one or more vehicle occupants from impact.

A variety of attachment mechanisms may be employed to connect the modular inflatable airbag cushions together. For example, the inflatable airbag cushion module may have an opening adjacent the perimeter of the airbag. Such openings can be configured to receive a fastener therein to connect the airbag cushion to another airbag. Such fasteners may include a ring, a clip, a tether, a knotted tether, a loop-knotted tether and the like.

Tethers may also be employed as part of the attachment mechanism independent of any opening in the airbag. Such tethers may have a first end which is connected to the inflatable airbag and a second end which is not connected to the airbag. The tether may then be joined to another tether connected to another airbag cushion. The tethers may have openings or attachment loops configured to receive fasteners such as rings, clips, knotted tethers, and loop-knotted tethers. Such fasteners may be detachable such as a ring, a clip, a knotted tether, a loop-knotted tether, and other devices which allow the airbags of the modules to be readily attached and detached to each other. Other fasteners may be permanent fasteners which do not allow the modules to be detached. Such permanent fasteners may be rivets, rings, clips, or other device which are permanently locked when installed.

The inflatable cushion modules of the present invention may be configured and installed within a vehicle to protect vehicle occupants seated in one or more rows of seats. For example, the three modules may be selected and installed within a vehicle with each module configured to protect occupants of the front, middle and rear seats respectively. The modules are interconnected such that when installed within a vehicle they function as a single long airbag cushion. That is, the interconnected cushion modules may protect passengers seated in the front, middle, and rear seats of a vehicle. When the modules are inflated the attachment mechanism allows the modules to form a single tension line along a side of the vehicle. In another possible configuration, two or more modular airbags of a generic size may be joined together to create a customized airbag system for a particular vehicle.

Generally airbag cushions are folded and packaged in a sock or other packaging prior to being installed in a vehicle. The folded configuration allows the airbag to fit within the limited space of the roof rail or other location within the vehicle. The airbag cushion modules of the present invention may be attached to another airbag when the airbag of the module is in the folded and packaged configuration.

When the airbag cushion module is to be attached to another airbag after the inflatable airbag is folded and packaged, the airbag cushion module may have an attachment mechanism for attaching the airbag cushion module to another airbag. The attachment mechanism is configured to be accessible when the airbag is in the folded and packaged configuration. Thus, an opening or a tether may be positioned adjacent the perimeter of the airbag and be accessible in the folded configuration. Such openings or tethers may be secured to an opening or tether of another airbag through fasteners. The fasteners may be either permanent fasteners such as a ring, a clip, and a rivet or removable fasteners such as a ring, a clip, a knotted tether, and a loop-knotted tether.

BRIEF DESCRIPTION OF THE DRAWINGS

A more particular description of the invention briefly described above will be rendered by reference to specific embodiments thereof which are illustrated in the appended drawings. These drawings depict only typical embodiments of the invention and are not therefore to be considered to be limiting of its scope. The invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of presently preferred embodiments of the invention.

The present invention provides modular inflatable airbag cushions which can be interconnected to function as a single airbag system. A modular inflatable airbag cushion has an airbag and an attachment mechanism which allows the airbag to be connected to another airbag. These principles will be shown and described in greater detail in conjunction with the following description and the accompanying figures.

Figure 1:
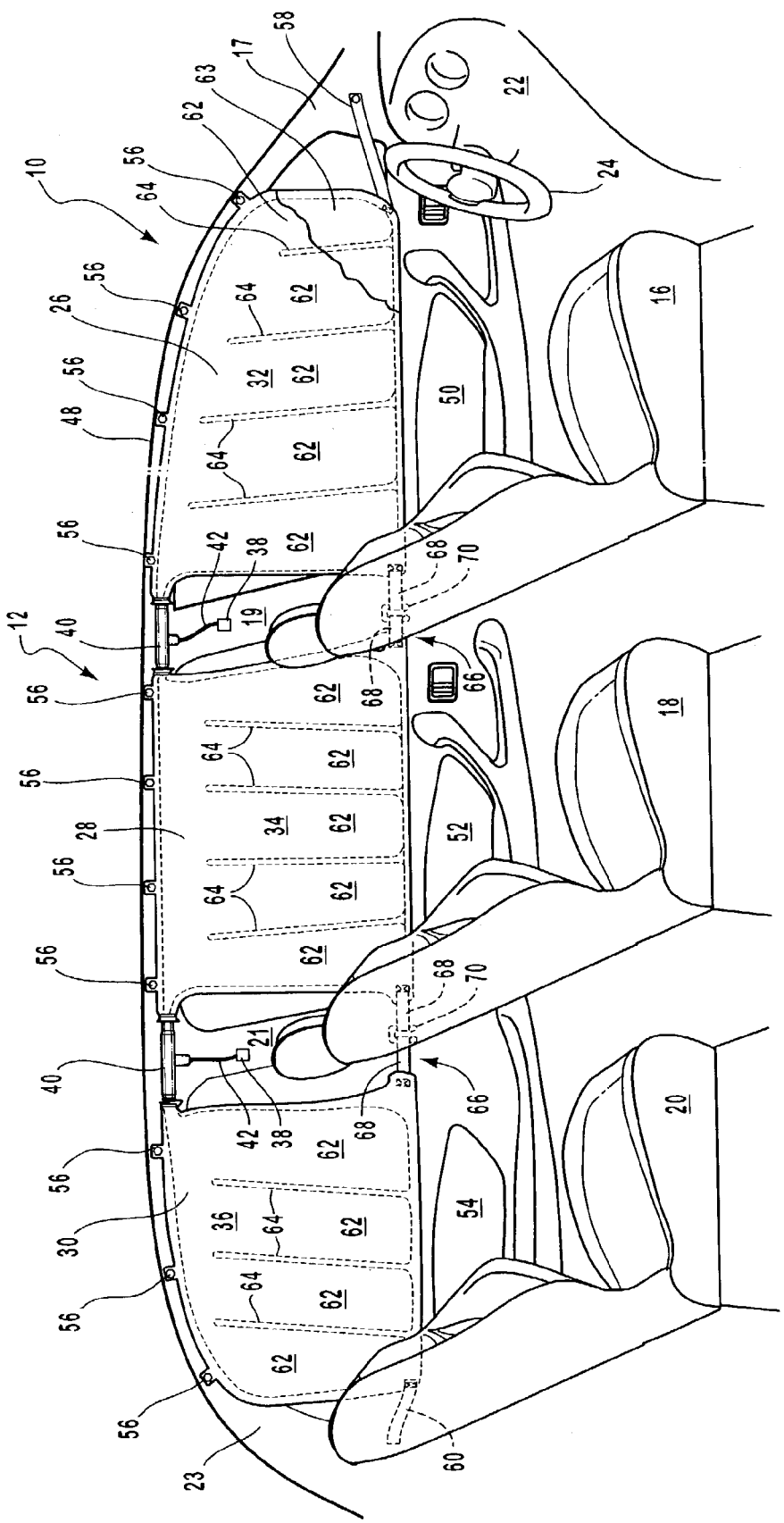
FIG. 1 is a cut away perspective view of the interior of a vehicle with a modular inflatable curtain system of the present invention.

Referring to FIG. 1, a cut away perspective view of the interior of a large passenger vehicle 10 is shown. The vehicle 10 can be a minivan or sport utility vehicle or other vehicle with three rows of seating. As illustrated, the vehicle has a front seat 16, a middle seat 18, and a rear seat 20. The vehicle also has four pillars, an A-pillar 17, a B-pillar 19, a C-pillar 21, and a D-pillar 23. A modular curtain airbag system 12 is installed in the vehicle 10 and configured to protect occupants or all rows of seating from a lateral impact.

The vehicle 10, may have a frontal impact airbag system (not shown) disposed within the instrument panel 22 or the steering wheel 24. Such frontal impact airbag systems generally consist of an inflatable cushion, an inflator, and a sensor such as an accelerometer. When the vehicle is in a frontal crash, the sensor activates the inflator which causes a pressurized gas to flow into the inflatable cushion thereby inflating the cushion and protecting the occupants of the front seat 16. However, such frontal impact systems do not protect occupants of the middle and rear seats 18, 20, and do not protect the occupants from lateral impacts.

To protect occupants from lateral impacts, a side impact airbag 12 also known as an inflatable curtain is installed in the vehicle. The present invention provides a modular side impact airbag system 12. The modular design of the system 12 removes many of the difficulties associated with large inflatable curtains. The modular systems are easier and less expensive to manufacture. Standard folding machines can be used to fold the cushion modules. Moreover, the cushion modules provide for faster and more uniform inflation than long multi-protection zone cushions. The modular system 12 has two or more inflatable airbag cushion modules which are interconnected by an attachment mechanism 66. The airbags 32, 34, 36 of each module 26, 28, 30 are configured to inflate when an activator or accelerometer 38 detects a lateral impact or rollover. The accelerometer 38 activates an inflator 40 via electrical lines 42. The activated inflator may then release a pressurized inflation gas into the airbags 32, 34, 36. As the airbags 32, 34, 36 inflate, they descend from the roof rail 48 of the vehicle 10. The inflated airbags 32, 34, 36 create a barrier between the lateral surfaces 50, 52, 54 of the vehicle 10 and an occupant of the front, middle, or rear seats 16, 18, 20.

In the illustrated embodiment, two inflators 40 are depicted. Each inflator 40 is connected to and inflates two of the cushion modules 26, 28, 30. However, in other configurations, a single inflator 40 may be used to inflate a single cushion module or all of the cushion modules 26, 28, 30. Thus, a gas line may be connected to a splitter or similar device allowing the gas to be directed into two or more airbags. The inflator 40 may take the form of a hollow pressure vessel containing a chemically reactive material and/or compressed gas that can be activated or released upon application of electricity to provide an outflow of inflation gases. Each cushion module 26, 28, 30 may have a gas line (not shown) to convey the inflation gases from the inflator 40 to the cushion module 26, 28, 30. The inflator 40 may operate with such rapidity that, before the vehicle 10 has fully reacted to the impact, the cushion modules 26, 28, 30 have inflated to protect vehicle occupants from impact.

Each of the cushion modules 26, 28, 30 is installed along one of the roof rails 48. Vehicle attachment flaps 56 are positioned along one or more edges of the cushion modules 26, 28, 30. The vehicle attachment flaps 56 may have one or more holes so that fasteners such as bolts, nuts, screws, rivets, flexible plastic parts, or the like can be used to affix the vehicle attachment flap 56 to the roof rail 48. The first and third modules 26, 30 may have one or more tethers 58, 60 by which the modular airbag system 12 is held in position during deployment. Thus, when the interconnected airbags 32, 34, 36 are inflated, the modules 26, 28, 30 of the airbag system 12 form a single tension line from the front of the vehicle to the rear of the vehicle 10, during deployment and inflation. This single tension line provides support against the impact of an occupant's body during a crash condition.

One problem with currently available long cushions with several protection zones is that as the gas chambers fill, the cushion is pulled (shrinks) such that the bottom ends of the cushion are pulled in. This angles the end chambers which in turn makes it difficult to cover the defined protection zones. The tethers 58, 60 can be designed with an amount of slack which allows for the tethers to pull the cushion back into position. With the proper slack in the tethers, the cushion does not shrink up as much at the ends.

The airbags 32, 34, 36 of the modular inflatable cushion system 12 may be produced using "lay flat" construction, in which the cushions 32, 34, 36 are constructed largely of flat, symmetrical elements affixed together. The cushion 32, 34, 36 may, for example, have a first membrane and a second, similarly shaped membrane. The first and second membranes may be formed from flexible, substantially gas-impermeable material, such as fabrics. According to lay flat construction, the first and second membranes may be made separately of a flexible material such as a fabric, and laid together, one on top of the other. In the alternative, the first and second membranes may be portions of a single piece of fabric folded together. The present invention contemplates both unitary and separate membranes.

The membranes are attached to create inflatable airbags 32, 34, 36. Each of the airbags 32, 34, 36 may be divided into a plurality of chambers 62, each of which is oriented substantially upright. The chambers 62 of each protection zone may be divided from each other through the use of chamber dividers 64, which may take the form of interior seams formed by attaching the first and second membranes together between the chambers 62 through weaving, sewing, bonding, RF welding, or the like. Extra fabric seams, polymer coatings, or the like may be used to form the interior seams with the selected attachment method.

A first module 26 is adjacent the front seat 16. The first module 26 has an inflatable airbag 32 and an attachment mechanism 66 for attaching the inflatable airbag 32 to another inflatable airbag. The vehicle 10 also has similar second and third inflatable airbag cushion modules 28, 30 adjacent the middle and rear seats of the vehicle 18, 20. The second and third cushion modules 28, 30 also have inflatable airbags 34, 36 and attachment mechanisms 66 for attaching the airbags 34, 36 to other airbags. The airbags 32, 34, 36 can be configured to have at least one inflatable chamber 62. The chambers 62 are each inflatable and balloon outward to create a pillow-like barrier between the first, second, and third lateral surfaces of the vehicle 50, 52, 54 and the occupants of the front, middle, and rear seats of the vehicle, respectively.

The attachment mechanisms 66 allow separate airbag modules 32, 34, 36 to be attached to other modules. Thus in the illustrated embodiment, the second airbag 34 is connected to the first and third airbags 32, 36. The attachment can take place after the airbags 32, 34, 36 are folded and packaged and before or after installation in the vehicle 10. The attached airbag modules 26, 28, 30 create a single airbag system 12 which protects the occupants in all rows of seating from lateral impacts. The attachment mechanism may include a tether 68 which is sewn or otherwise attached adjacent the perimeter of the airbag 32, 34, 36. The tether 68 may be configured to receive a clip 70 which connects the tether to a second tether 68 of another airbag, thereby connecting the two airbags.

Figure 2:
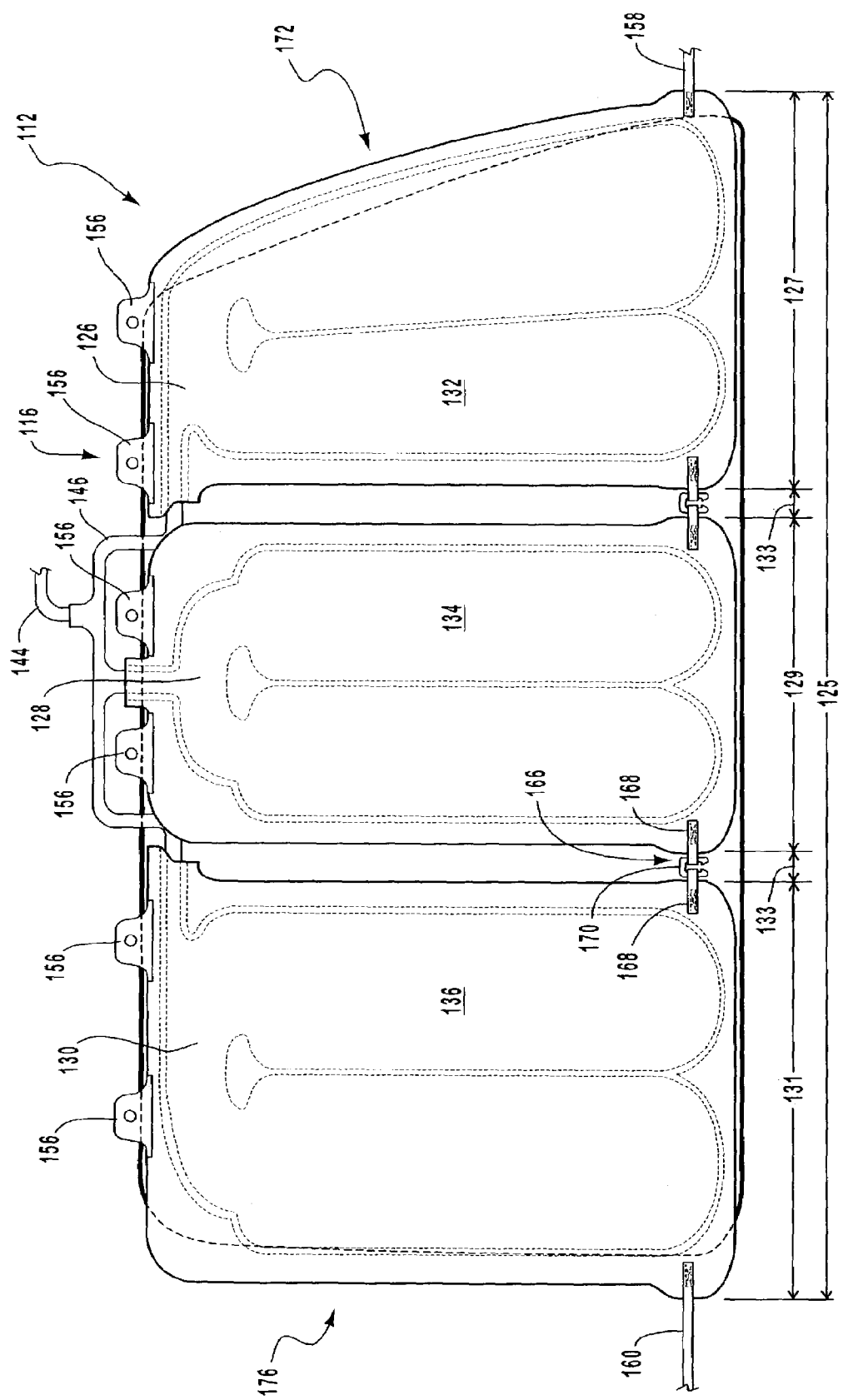
FIG. 2 is a perspective view of an alternative embodiment of a modular curtain system installed within a vehicle.

Referring now to FIG. 2, a modular airbag system 112 is shown configured to protect the occupants of a single row of seats. When an automaker designs and manufactures a line of vehicles the seating arrangement of that line of vehicle may differ widely from other lines of vehicles of the same automaker. Likewise similar types of vehicles such as minivans made by different automakers may have widely varying seating arrangements. For this reason, airbags cannot be made in a one-size fits all manner, but for each new line of vehicles an airbag must be designed and manufactured. Individual design and manufacture of airbags adds to the cost of the airbag and vehicle. For example, in FIG. 2 a front seating area 116 of a vehicle is shown. The front seating area 116 may have a length 125 in which the occupant of the seat will require protection from lateral impact. With a traditional airbag curtain, the curtain will have to be designed and manufactured to fit the specific dimensions of the front seating area 116. That is a single airbag cushion would have to be made with sufficient area to protect the occupant of the front seat for the length 125 of the seating area.

However, the cushion modules of the present invention can be combined to create a customized airbag system for a particular vehicle. For example, an inflatable curtain system may be designed to fit within the length 125 of a seating area 116. Three inflatable cushion modules 126, 128, 130 may be selected to fit the length 125 of the seating area 116. The first curtain module 126 may be generically designed to fit a front portion 172 of a seating area 116. The third cushion module 130 may be generically designed to fit a rear portion of the seating area 176. A middle or second cushion module 128 is selected to finish the customized cushion system. The first and third cushion modules 126, 130 have a length 127, 131. The length 129 of the second cushion module 116 may be selected such that the combined lengths 127, 129, 131 of the cushion modules 126, 128, 130 plus spacing 133 between the modules is equal to the length 125 of the protection zone of the seat area 116. It will be appreciated that the length of any of the cushion modules, not only the middle cushion module, may be selected to create the customized fit of the airbag system.

Like the modular inflatable cushions described above, the cushion modules 126, 128, 130 have an airbag 132, 134, 136 which can be connected to another airbag through an attachment mechanism 166. Such attachment mechanism may include a tether 168 which can be connected to a tether 168 of another cushion by a fastener such as a clip 170. Additionally, the cushions 126, 128, 130 can be secured to a vehicle through one or more attachment flaps 156.

A single inflator (not shown) can be configured to inflate all of the airbags 132, 134, 136 of the modular airbag system 112. A gas line 144 conducts the inflation gas from an activated inflator into a gas guide 146. The gas guide 146 can split the stream of gas flow and direct a portion thereof into each of the airbags 132, 134, 136. In the alternative each airbag 132, 134, 136 may be inflated by its own inflator or any combination of airbags may be inflated by a single inflator.

The interconnected modules 126, 138, 130 of the modular airbag system 112 may be connected to other inflatable airbag systems (not shown) to create a modular system for protecting passengers seating in more than one seating area of a vehicle. Accordingly, a tether or other attachment device 158, 160 may be provided on either or both of the first and third airbag modules 126, 130. These attachment devices are configured to allow a modular system 112 designed to protect the occupants of a single row of seating to be connected to a larger system protecting passengers seated in two or more rows of seating. Additionally, the tethers 158, 160 may be secured to the vehicle to assisting in the proper positioning of the modular airbag system 112 during inflation of the airbags 132, 134, 136.

Figure 3:
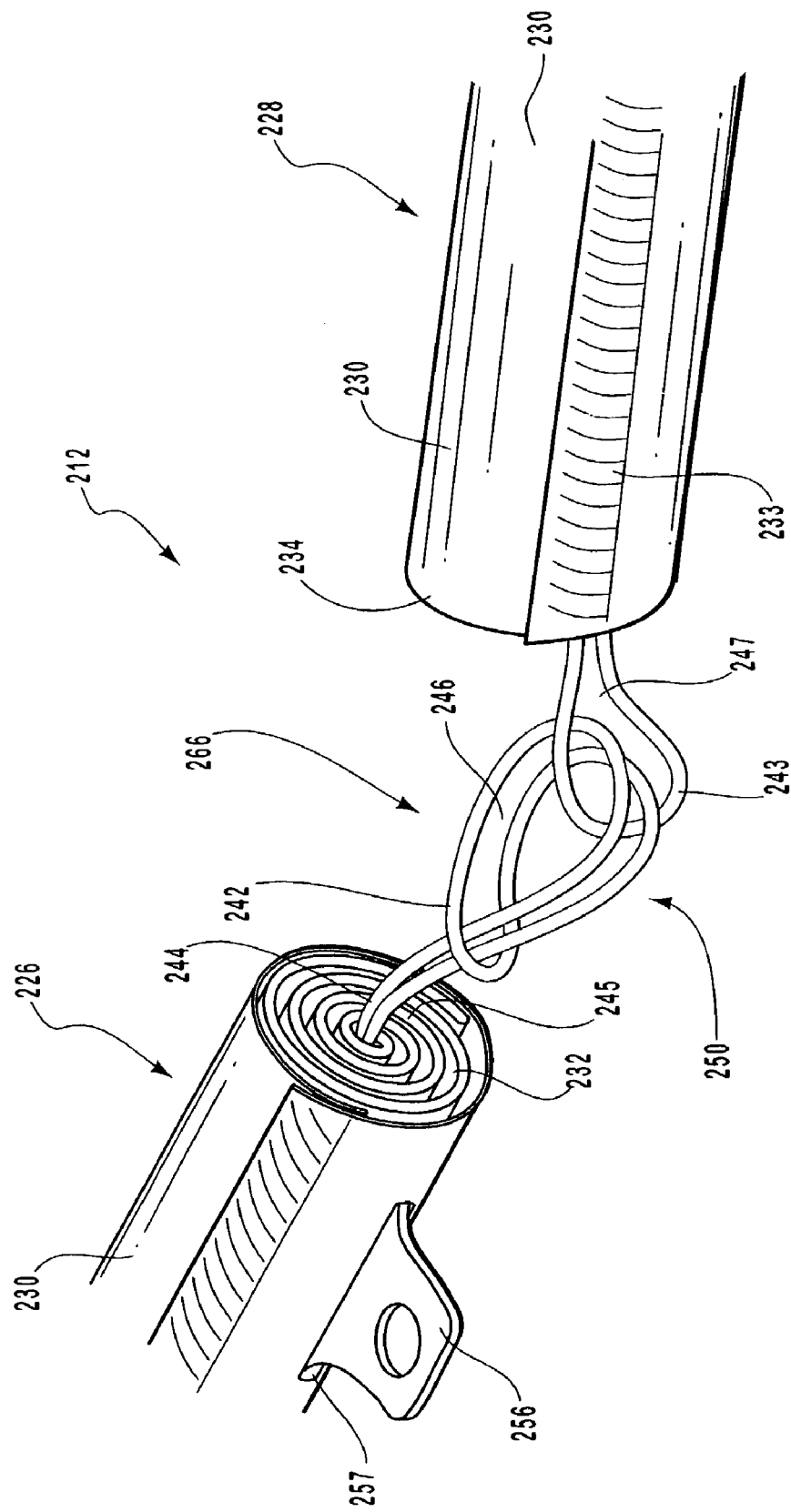
FIG. 3 is a perspective view of folded and packaged cushion modules connected by looped tethers.

Referring now to FIG. 3, the connection of two cushion modules 226, 228 of a modular airbag system 212 is shown. A first cushion module 226 is shown in a folded configuration. A folded airbag 232 is packaged to hold the airbag 232 in the folded configuration. The package containing the folded airbag 232 is generally referred to as a sock 230. The sock 230 is configured such that as airbag 232 inflates, the sock 230 opens allowing the cushion module to inflate downward from the roof rails. A release mechanism 233 can be built into the sock 230 to facilitate the release of the inflating airbag 232.

The sock 230 may also be configured to allow the cushion module to be installed in a vehicle after packaging. Thus, slots 257 may be provided which allow for the attachment flaps 256 to extend through the sock 230. The attachment flaps 256 may be secured to the vehicle as previously described. Additionally, the sock 230 may be open at the end 259 allowing tethers or other attachment mechanisms 266 to be accessible for attachment of the airbag 232 to another airbag 234 or the vehicle.

In the illustrated embodiment, the first curtain module 226 has a tether 242 attached adjacent the perimeter of the airbag 232. The tether 242 is attached by both ends 244, 245 to the airbag 232 creating a loop 246. A second tether 243 is connected to the second airbag 234 in a similar manner creating a second loop 247.

The looped tethers 242, 243 create a simple attachment mechanism 266 whereby the cushion modules 232, 234 can be attached after packaging into the socks 230 and without the use of any tools. A portion of the first loop 246 is passed through the second loop 247. The first looped tether is then pulled through sufficiently such that the first airbag 232 can be passed though the portion of the first looped tether 242 that extends beyond the second looped tether 243. The packaged airbags 232, 234 are then pulled away from each other causing the resulting looped-knot 250 to tighten. Because no metal or plastic parts are used to attach the airbags 232, 234, noise from rattle of airbag parts installed in the roof rails is eliminated. Additionally, the cost of the airbag is reduced by the elimination of a clip or similar fastening device.

Figure 4:
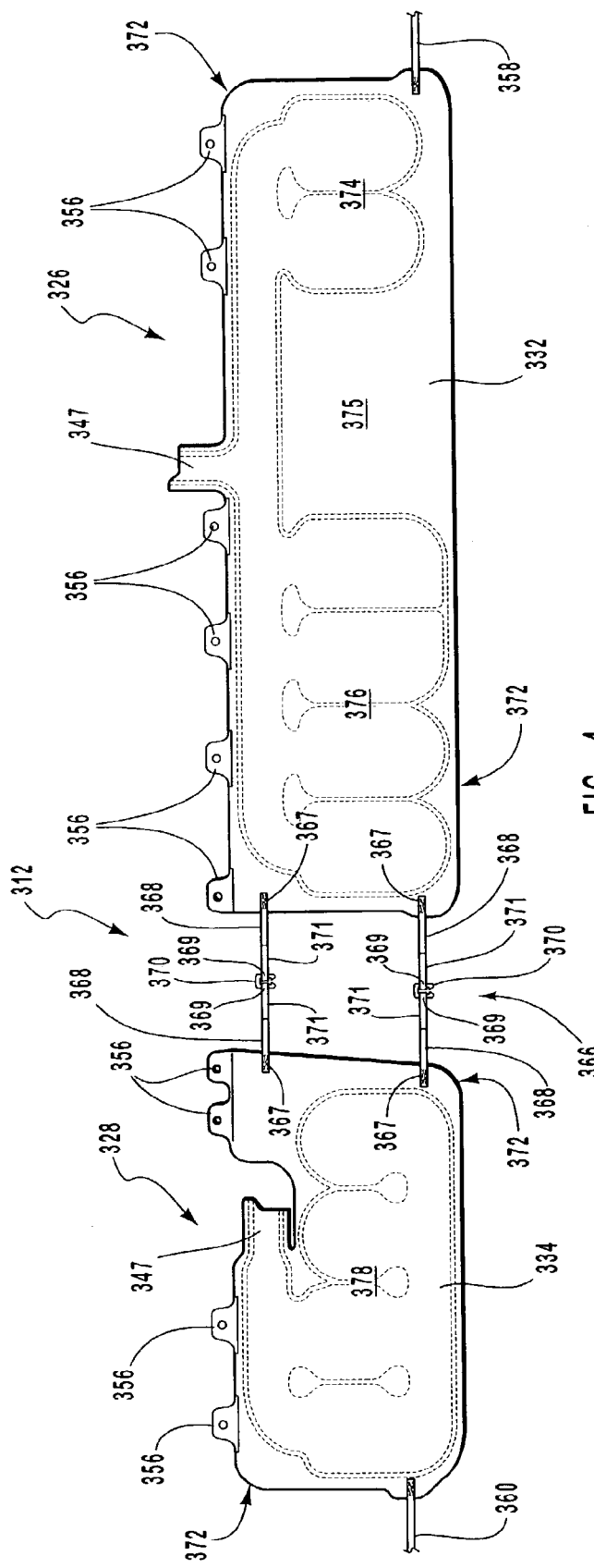
FIG. 4 is side plan view of an embodiment of the cushion modules showing an alternative for connecting the cushions.

Referring now to FIG. 4, an alternative embodiment of a modular cushion system 312 is shown. The system has a first cushion module 326 and a second cushion module 328. The cushion modules 326, 328 are shown in an unpackaged configuration. The cushions each have multiple attachment flaps 356 for securing the cushion modules 326, 328 to a vehicle as previously described. The cushion modules 326, 328 also have tethers 358, 360 to allow for additional securing of the modules 326, 328 to the vehicle. Gas passages 347 are configured to receive inflation gases from an inflator (not shown).

Each of the modules 326, 328 has an inflatable airbag 332, 334 and an attachment mechanism 366 for attaching the airbag 332, 334 to another airbag. Two tethers 368 are attached adjacent the perimeter 372 of each cushion module 326, 328. A first end 367 of the tethers 368 is secured to the cushion modules 326, 328 through a mechanism such as sewing, gluing, welding, rivets, and the like. A second end of the tethers 369 is configured to present an attachment loop 371. A fastener such as a clip 370 is inserted into an attachment loop 371 from each module 326, 328 and then secured by crimping. Thus, the airbag modules are interconnected and can function as a single airbag system.

It will be appreciated that the airbags 332, 334 of the cushion modules of the present invention may be configured to have one or more protection zones, each protection zone configured to protect the occupants seated within a row of seats in the vehicle. For example, the first airbag cushion 332 is configured to have two protection zones 374, 376 to protect occupants of the front and middle seats of the vehicle respectively. The second airbag 334 has a single protection zone configured 378 to protect the occupants of the rear seat of the vehicle. Likewise the second airbag 332 could be configured with two or more protection zones, and the first airbag 334 could be configured to have a single protection zone. A connecting zone 375 may be provided between first and second protection zones 374, 376 of the first airbag 332. The connection zone 375 tethers the protection zones 374, 376 together. Additionally, the connection 375 zone does not inflate which allows the protection zones 374, 376 of the airbag 332 to inflate around the seats, seatbelts and other obstacles in the vehicle.

Figure 5:
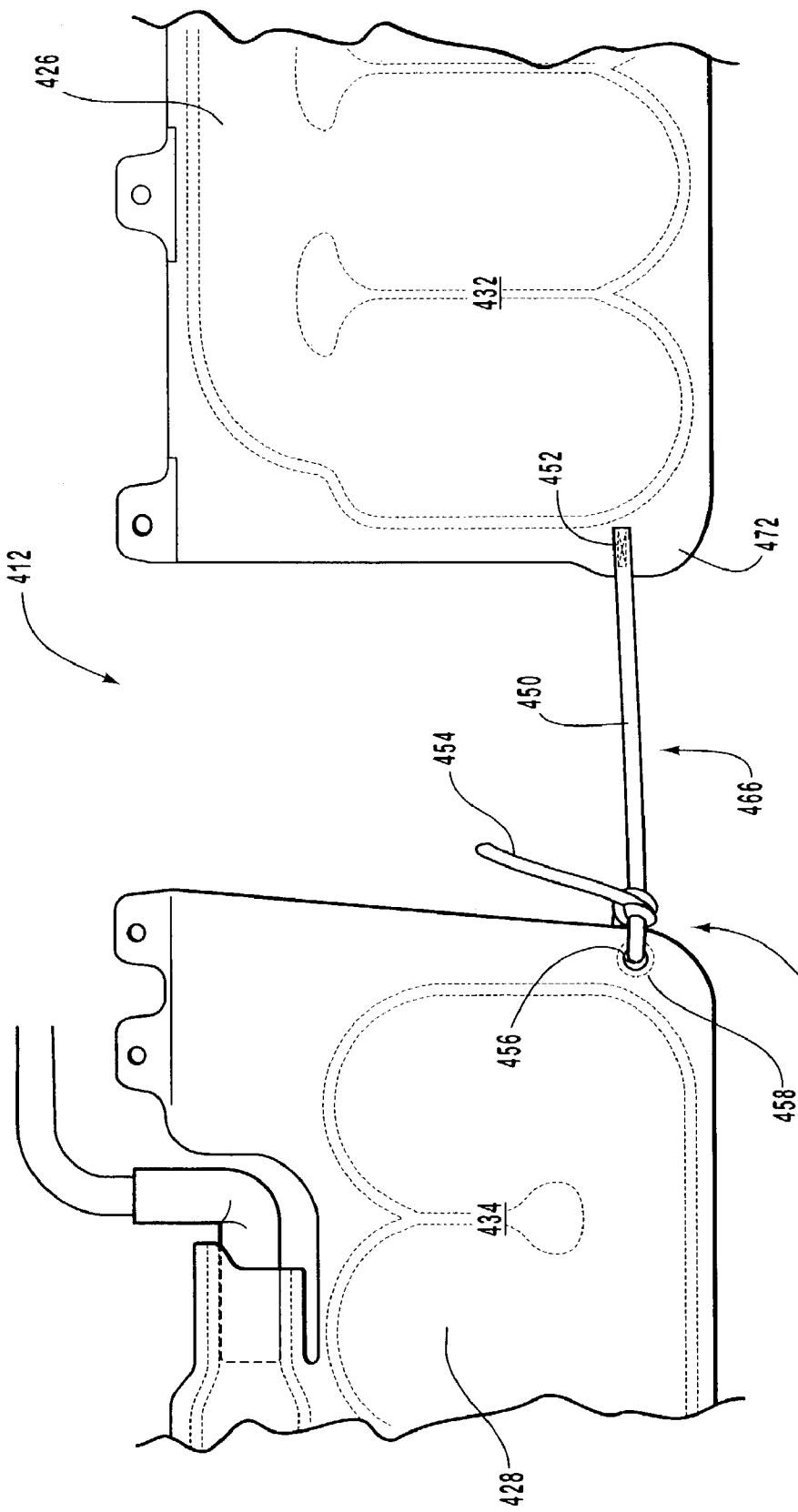
FIG. 5 is a side plan view of an additional embodiment of the cushion modules showing an alternative for connecting the cushions.

Referring now to FIG. 5, a set of attached cushion modules 412 is shown. First and second inflatable cushion modules 426, 428 are presented. Each cushion module 426, 428 has an airbag 432, 434 and an attachment mechanism 466 for attaching the airbags 432, 434 to each other. As shown, the attachment mechanism may have a tether 450 having a first end 452 and a second end 454. The first end 452 of the tether 450 is attached adjacent the perimeter 472 of the first airbag 432 by sewing, gluing, welding, riveting, and like secure attachment mechanisms. The second end 454 of the tether 450 is passed through an opening 456 in the second airbag 434. The opening 456 in the second airbag may have reinforcements 458 such as stitching, grommets, eyelets, or the like. After the second end 454 of the tether 450 is passed through the opening 456, the tether 450 can be secured to the second airbag by a knot 460. In the illustrated embodiment, the knot 460 is a slip knot such as a double half hitch which tightens under tension. However, other knots 460 may be used which will securely fasten the tether 432 to the second airbag 434. While a single tether 450 is shown knotted through the opening 456, it will be appreciated that two or more tethers and openings may be used to attach the airbags 432, 434.

Figure 6:
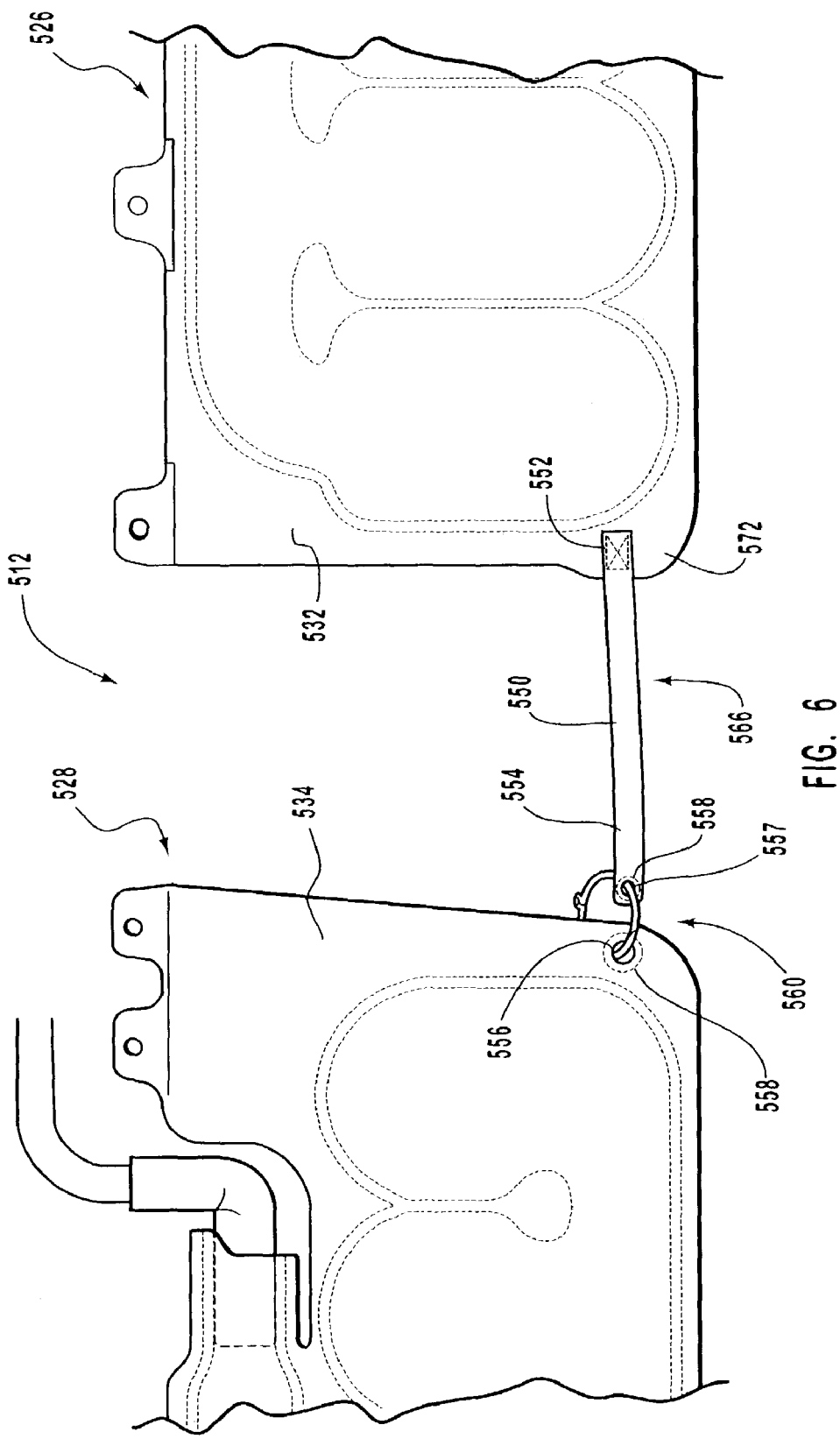
FIG. 6 is a side plan view of an additional embodiment of the cushion modules showing an alternative for connecting the cushions.

Referring now to FIG. 6, a set of attached cushion modules 512 is shown. A first and second inflatable cushion module 526, 528 are presented. Each cushion module 526, 528 has an airbag 532, 534 and an attachment mechanism 566 for attaching the airbags 532, 534 to each other. As shown, the attachment mechanism may have a tether 550 having a first end 552 and a second end 554. The first end 552 of the tether 550 is attached adjacent the perimeter 572 of the first airbag 532 by sewing, gluing, welding, riveting, and like secure attachment mechanisms. The second end 554 of the tether 550 can be configured to present an opening 557. A fastener 560 such as a ring is passed through the opening 557 and an opening 556 in the second airbag 534. The openings 556, 557 may have reinforcements 558 such as stitching, grommets, eyelets, or the like. After the fastener 560 is passed through the both of the openings 556, 557, the fastener may be closed by crimping, welding, locking or the like thereby attaching the first and second cushion modules 526, 528. While a single tether 550 is shown attaching the first and second cushion modules 526, 526 it will be appreciated that two or more tethers and openings may be used to attach the airbags 526, 528.

Referring now to FIGS. 7A through 7H, examples of alternative clips and fasteners that may be used to connect attachment tethers 668 of inflatable airbag cushion modules are presented. These examples are only a few of the many possible clips and fasteners than can be configured to be inserted into attachment loops 671 of tethers. Therefore it will be appreciated, that these illustrative examples of fasteners and tethers are not limiting on the scope of the claimed invention. The clips and fasteners may be made of metal or plastic. Such clips and fasteners may be sufficiently flexible so that when a closing force is applied the fastener closes without breaking. The clips and fasteners may also be sufficiently resilient such that when a force is placed on the tethers from an inflating airbag, the clips and fasteners do not open.

Figure 7A:
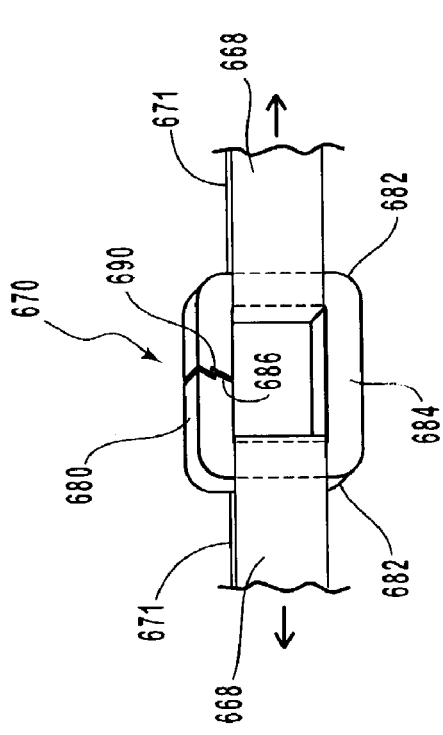
FIGS. 7A through 7H are perspective views of examples of various clips that may be used to connect inflatable curtain modules.

Referring to FIG. 7A, a clip 670 is shown with an "n" configuration. The clip 670 has a top 680, sides 682, and a bottom, 684. Protrusions 686 are adjacent the bottom 684 of the clip 670. When the clip 670 is in an open configuration (not shown), the attachment loops 671 of the tethers 668 may be inserted through an opening near the bottom 684 of the clip. After the loops 671 are inserted into the clip 670, inward pressure may be applied to the sides 682 of the clip causing the opening to close and the protrusions 686 to touch.

Figure 7B:
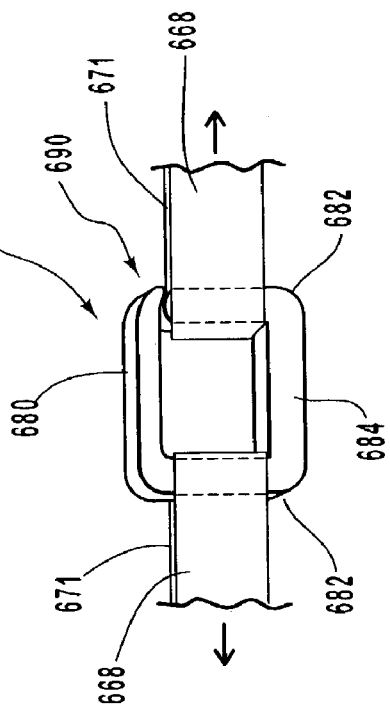

Referring to FIG. 7B, an alternative faster 670 is shown with an overall "o" configuration. The fastener 670 has a top 680, sides 682, and a bottom, 684. A slit 690 is positioned near the top 680 of the fastener. The fastener 670 has one or matching protrusions 686 along the edges of the slit 690. When the fastener 670 is in an open configuration (not shown), the attachment loops 671 of the tethers 668 may be inserted through the slit 690. After the loops 671 are inserted into the fastener 670, inward pressure may be applied to the sides 682 of the clip causing the slit 690 to close and the protrusions 686 to touch. The touching protrusions 686 lock the fastener keeping the attachment loops 671 inside the fastener.

Figure 7C:
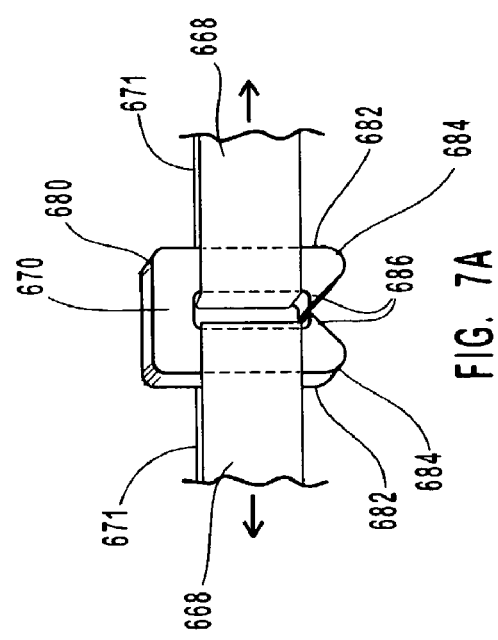

Referring to FIG. 7C, an alternative faster 670 is shown with an overall "o" configuration. The fastener 670 has a top 680, sides 682, and a bottom, 684. A slit 690 is positioned near the top 680 of the fastener. The fastener 670 has a protrusion 686 along the bottom edge 692 of the slit 690. When the fastener 670 is in an open configuration (not shown), the attachment loops 671 of the tethers 668 may be inserted through the slit 690. After the loops 671 are inserted into the fastener 670, pressure may be applied to the sides 682 of the fastener 670, causing the slit 690 to close and the protrusion 686 to lock the fastener 670 in a closed configuration.

Figure 7D:
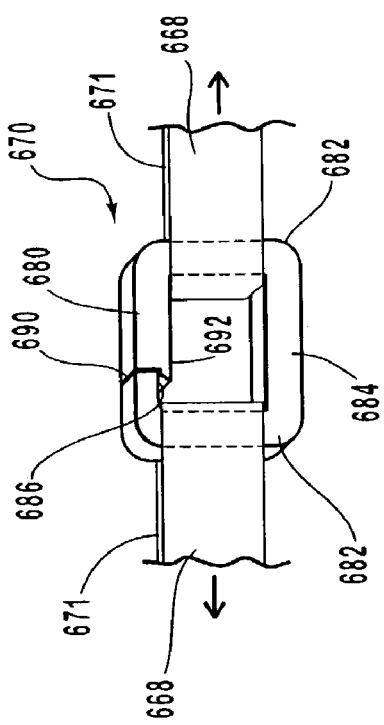

Referring to FIG. 7D, an alternative faster 670 is shown with an overall "o" configuration. The fastener 670 has a top

680, sides 682, and a bottom, 684. A slit 690 is positioned near the top 680 and one side 682 of the fastener. When the fastener 670 is in an open configuration (not shown), the attachment loops 671 of the tethers 668 may be inserted through the slit 690. After the loops 671 are inserted into the fastener 670, a crimping force may be applied to the top 680 and bottom 684 of the fastener 670, causing the slit 690 to close thereby enclosing the attachment loops 671 in the fastener 670.

Figure 7F:
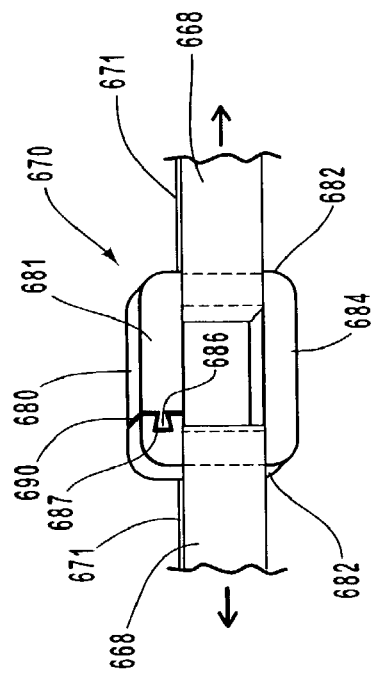
Figure 7H:
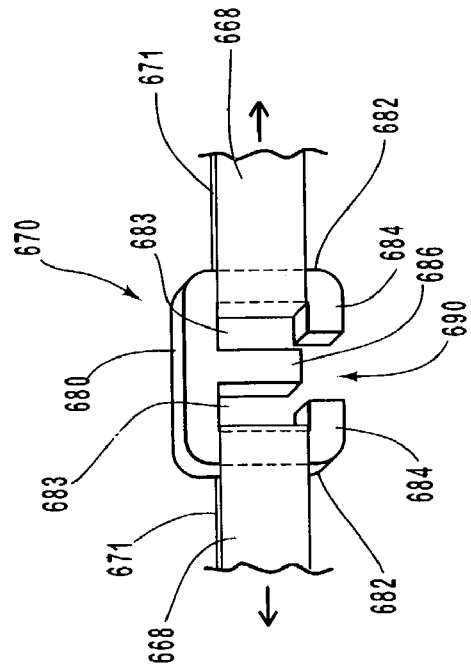
Figure 7E:
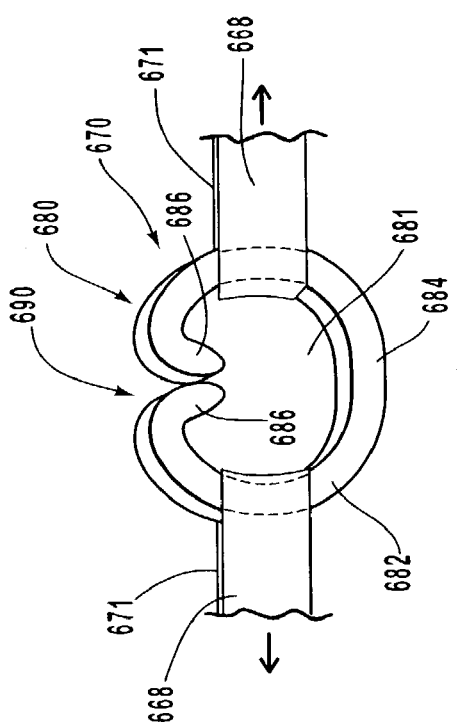

Referring to FIG. 7E, an alternative faster 670 is shown with an overall ring shape. The fastener 670 has a top 680, sides 682, and a bottom, 684. A slit 690 is positioned near the top 680 of the fastener. The fastener 670 has two protrusions 686 on either side of the slit 690. The protrusions 686 project in toward the center 681 of the fastener. When the fastener 670 is in an open configuration (not shown), the attachment loops 671 of the tethers 668 may be inserted through the slit 690. After the loops 671 are inserted into the fastener 670, pressure may be applied to the sides 682 of the fastener 670, causing the opening to close and the protrusion 686 to touch. As the protrusion 686 touch under the crimping pressure, the protrusions 686 may bend inwardly creating a flange in the center 681 of the fastener.

Referring to FIG. 7F, an alternative faster 670 is shown with an overall "o" configuration. The fastener 670 has a top 680, sides 682, and a bottom, 684. A slit 690 is positioned near the top 680 of the fastener. The fastener 670 has a slot 687 on a first side of the slit 690. The slot 687 is configured to receive therein a protrusion 686 which is located on a second side of the slit 690. When the fastener 670 is in an open configuration (not shown), the attachment loops 671 of the tethers 668 may be inserted through the slit 690. After the loops 671 are inserted into the fastener 670, the protrusion 686 may be inserted into the slot 687 thereby locking the attachment loops 671 in the fastener 670.

Figure 7G:
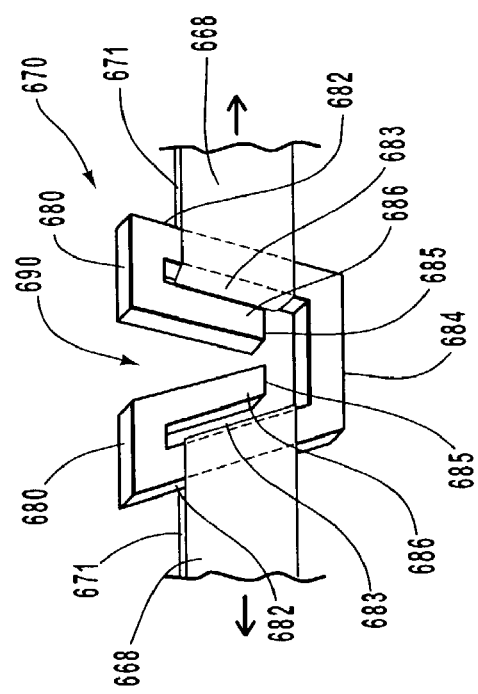

Referring to FIG. 7G, a clip 670 is shown with an overall "v" configuration. The clip 670 has a top 680, sides 682, and a bottom, 684. Protrusions 686 project from the top 680 of the clip 670 toward the bottom 684 of the clip 670. The protrusions 686 and sides 682 of the clip 670 create slots 683. The slots 683 can receive the attachment loops 671 of tethers 668. The attachment loop 671 may be threaded over the tip 685 of the protrusion 686 and slid over the top 680 and down the side 682 of the clip 670. The attachment loop 671 will then be positioned in the slot 683 and held in place by the top 680, side 682, bottom 684, and protrusion 686 of the clip 670. This type of clip can be used to attach two cushion modules without the need for any tools or may by crimped closed.

Referring to FIG. 7H, a clip 670 is shown with an overall "m" configuration. The clip 670 has a top 680, sides 682, and a bottom, 684. A protrusion 686 projects from the top 680 of the clip 670 toward the bottom 684 of the clip 670. The protrusion 686 bisects the clip 670 creating two slots 683. The slots 683 are bounded by the top 680, a side 682, the bottom 684, and the protrusion 686. An opening 690 in the bottom 684 allows an attachment loop 671 to be threaded through the opening 690, over the bottom 684, and onto the side 682 of the clip 670. Thus inserted on the clip 670, the attachment loop 671 is held in the slot by the top, side, bottom and protrusion. This type of clip can also be used to attach two cushion modules without the need for any tools.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

We claim:

1. An inflatable airbag cushion module comprising:
   an inflatable airbag having an inflatable zone and an uninflatable perimeter; and
   an attachment mechanism connected to the perimeter for attaching the inflatable airbag to another inflatable airbag such that the airbags when attached form a single airbag system,
   wherein the attachment mechanism comprises one or more tethers having a first end connected to the perimeter of the inflatable cushion module and a second end distal from the inflatable cushion configured such that the second end of the tether is attachable to a corresponding tether attached to another airbag.

2. The cushion module of claim 1 further comprising an attachment loop adjacent the second end of the tether, the attachment loop configured for the attachment of the inflatable cushion to the tether of the other inflatable cushion.

3. The cushion module of claim 2 wherein the attachment loop is configured to attach the inflatable cushion module to the tether of the other inflatable cushion module by a detachable fastener.

4. The cushion module of claim 3, wherein the detachable fastener is selected from the group consisting of a ring, a clip, a knotted tether, and a loop-knotted tether.

5. The cushion module of claim 2, wherein the attachment loop is configured to attach the inflatable cushion module to the other inflatable cushion module by a looped knot.

6. An inflatable cushion module comprising:
   an inflatable airbag having a tether attachable to a vehicle; and
   an attachment mechanism for attaching the inflatable airbag to another inflatable airbag, wherein the inflatable airbags, when attached and installed in a vehicle, form a single tension line from the tether through the airbag and attachment mechanism along a side of a vehicle when the airbags are inflated, wherein the attachment mechanism comprises a detachable fastener.

7. The cushion module of claim 6, wherein the attachment mechanism comprises an opening adjacent a perimeter of the inflatable airbag, the opening configured to receive therein the fastener.

8. The cushion module of claim 7, wherein the fastener is selected from the group consisting of a ring, a clip, a knotted tether, and a loop-knotted tether.

9. The cushion module of claim 6, wherein the attachment mechanism comprises one or more tethers having a first end connected to the inflatable cushion module and a second end distal from the inflatable cushion.

10. The cushion module of claim 9, further comprising an attachment loop adjacent the second end of the tether, the attachment loop configured for the attachment of the inflatable cushion to the other inflatable cushion.

11. The cushion module of claim 10, wherein the attachment loop is configured to attach the inflatable cushion module to the other inflatable cushion module by the detachable fastener.

12. The cushion module of claim 11, wherein the detachable fastener is selected from the group consisting of a ring, a clip, a knotted tether, and a loop-knotted tether.

13. The cushion module of claim 10, wherein the attachment loop is configured to attach the inflatable cushion module to the other inflatable cushion module by a looped knot.

14. An inflatable cushion module comprising:
an inflatable airbag;
a tether having a first end secured to the inflatable airbag and a second end distal from the inflatable airbag; and
an attachment mechanism adjacent the second end of the tether, the attachment mechanism configured for the attachment of the airbag cushion to a corresponding tether secured to another airbag cushion.

15. The cushion module of claim 14, wherein the fastener comprises a permanent fastener.

16. The cushion module of claim 15, wherein the permanent fastener is selected from the group consisting of a ring, a clip, and a rivet.

17. The cushion module of claim 14, wherein the fastener is selected from the group consisting of a ring, a clip, a knotted tether, and a loop-knotted tether.

18. The cushion module of claim 14, wherein the attachment mechanism further comprises one or more tethers having a first end connected to the inflatable cushion module and a second end distal from the inflatable cushion.

19. The cushion module of claim 18, further comprising an attachment loop adjacent the second end of the tether, the attachment loop configured for the attachment of the inflatable cushion to the other inflatable cushion.

20. The cushion module of claim 19, wherein the attachment loop is configured to attach the inflatable cushion module to the other inflatable cushion module by the fastener.

21. The cushion module of claim 20, wherein the fastener is selected from the group consisting of a ring, a clip, a knotted tether, and a loop-knotted tether.

22. The cushion module of claim 19, wherein the attachment loop is configured to attach the inflatable cushion module to the other inflatable cushion module by a looped knot.

23. An inflatable cushion module comprising:
an inflatable airbag;
a package for containing the inflatable airbag in a folded configuration; and
a tether secured to the inflatable airbag for attaching the inflatable airbag to another inflatable airbag by means of a corresponding tether secured to said other inflatable airbag such that the inflatable airbag is connected to the other inflatable airbag after the packaging of the inflatable airbag in the package.

24. The cushion module of claim 23, further comprising a fastener for attaching said tethers.

25. The cushion module of claim 24, wherein the fastener is selected from the group consisting of a ring, a clip, and a rivet.

26. The cushion module of claim 23, wherein the tethers are knotted or loop-knotted.

27. The cushion module of claim 23, further comprising an attachment loop adjacent the second end of the tether, the attachment loop configured for the attachment of the inflatable cushion to the tether of the other inflatable cushion.

28. The cushion module of claim 27, wherein the attachment loop is configured to attach the inflatable cushion module to the other inflatable cushion module by a fastener.

29. The cushion module of claim 28, wherein the fastener is selected from the group consisting of a ring, a clip, a knotted tether, and a loop-knotted tether.

30. The cushion module of claim 27, wherein the attachment loop is configured to attach the inflatable cushion module to the other inflatable cushion module by a looped knot.

31. An inflatable cushion module comprising:
an inflatable airbag having an inflatable zone and an uninflatable perimeter;
a tether having a first end secured to the perimeter of the inflatable airbag and a second end distal from the inflatable airbag; and
an attachment loop adjacent the second end of the tether and formed by the tether, the attachment loop configured for the attachment of the inflatable cushion module to another inflatable cushion.

32. The cushion module of claim 31, wherein the attachment loop is configured to attach the inflatable cushion module to the other inflatable cushion module by a fastener.

33. The cushion module of claim 32, wherein the fastener is selected from the group consisting of a ring, a clip, a knotted tether, and a loop-knotted tether.

* * * * *